US009663378B2

(12) United States Patent
Gutierrez et al.

(10) Patent No.: US 9,663,378 B2
(45) Date of Patent: May 30, 2017

(54) METHOD OF MAGNETIZING NATURAL AND SYNTHETIC ALUMINOSILICATES

(75) Inventors: Marlen Gutierrez, Estacion Central Santiago (CL); Mauricio Escudey, Estacion Central Santiago (CL); José Fabris, Estacion Central Santiago (CL); Dora Altbir, Estacion Central Santiago (CL); Juliano Casagrande, Estacion Central Santiago (CL)

(73) Assignee: Universidad de Santiago de Chile (CL)

( * ) Notice: Subject to any disclaimer, the term of this patent is extended or adjusted under 35 U.S.C. 154(b) by 799 days.

(21) Appl. No.: 13/520,142

(22) PCT Filed: Dec. 27, 2010

(86) PCT No.: PCT/CL2010/000056
§ 371 (c)(1),
(2), (4) Date: Nov. 12, 2012

(87) PCT Pub. No.: WO2011/079403
PCT Pub. Date: Jul. 7, 2011

(65) Prior Publication Data
US 2013/0116339 A1 May 9, 2013

(30) Foreign Application Priority Data

Dec. 29, 2009 (CL) .................................. 2229-2009

(51) Int. Cl.
C01B 39/26 (2006.01)
H01F 10/28 (2006.01)
C01B 39/02 (2006.01)
B01D 19/00 (2006.01)
B01J 20/02 (2006.01)
(Continued)

(52) U.S. Cl.
CPC .............. *C01B 39/026* (2013.01); *B01D 3/02* (2013.01); *B01D 19/0036* (2013.01); *B01J 20/0229* (2013.01); *B01J 20/06* (2013.01); *B01J 20/08* (2013.01); *B01J 20/186* (2013.01); *B01J 20/28009* (2013.01); *B01J 20/3204* (2013.01); *B01J 20/3236* (2013.01); *B01J 29/06* (2013.01); *B01J 35/0033* (2013.01); *C02F 1/681* (2013.01);
(Continued)

(58) Field of Classification Search
CPC ........ C01B 39/00–39/54; H01F 10/007; H01F 10/28; H01F 41/14; H01F 41/28
USPC ........................................................ 252/62.56
See application file for complete search history.

(56) References Cited

FOREIGN PATENT DOCUMENTS

JP 2008284520 A 11/2008
WO WO 2011079403 A2 7/2001

OTHER PUBLICATIONS

Pode. Pb(II) Ion Exchange on Zeolite—Supported Magnetite. Characterization of Process by Effective Diffusivity CoefficientStudies in Surface Science and Catalysis 142. 2002.*
Park. Oxidative dehydrogenation of ethylbenzene with carbon dioxide over zeolite-supported iron oxide catalysts. Res. Chem. Intermed., vol. 28, No. 5, pp. 461-469 (2002).*
Fernandez-Pacheco. Highly magnetic silica-coated iron nanoparticles prepared by the arc-discharge method.Nanotechnology 17 (2006) 1188-1192.*
(Continued)

*Primary Examiner* — Matthew E Hoban
(74) *Attorney, Agent, or Firm* — Tolpin & Partners, PC; Thomas W. Tolpin

(57) ABSTRACT

Procedure for the magnetization of different inorganic surfaces, whether natural or synthetic, such as aluminosilicates, both synthetic and natural (natural zeolites, synthetic zeolites, alumina, allophane, among others) that give magnetic properties to those surfaces. Objectives of the present application are also the above mentioned surfaces, magnetized, and their different uses.

2 Claims, 6 Drawing Sheets

(51) Int. Cl.
    *B01J 20/06*     (2006.01)
    *B01J 20/08*     (2006.01)
    *B01J 20/18*     (2006.01)
    *B01J 20/28*     (2006.01)
    *B01J 20/32*     (2006.01)
    *B01J 29/06*     (2006.01)
    *B01J 35/00*     (2006.01)
    *C02F 1/68*     (2006.01)
    *H01F 1/01*     (2006.01)
    *B01D 3/02*     (2006.01)
    *C02F 1/48*     (2006.01)
    *C02F 101/32*     (2006.01)

(52) U.S. Cl.
    CPC ............... *H01F 1/01* (2013.01); *C02F 1/488* (2013.01); *C02F 2101/32* (2013.01)

(56) References Cited

OTHER PUBLICATIONS

Jaen. Characterization of the end products of the hydrolysis of iron in aqueous solution. Hyperfine interatctions 88 (1994) 59-64.*
Adebajo. Porous Materials for Oil Spill Cleanup: A Review of Synthesis and Absorbing Properties. Journal of Porous Materials 10: 159-170, 2003.*
Patent Cooperation Treaty, "PCT Written Opinion of the International Searching Authority" for International Application No. PCT/CL2011/000056, WO 2011079403.
Patent Cooperation Treaty, PCT Notification Concerning Availability of the Publication of International Application No. PCT/CL2011/000056, WO 2011079403.
Patent Cooperation Treaty, "PCT International Search Report" for International Application No. PCT/CL2011/000056, WO 2011079403.

* cited by examiner

FIG. 3
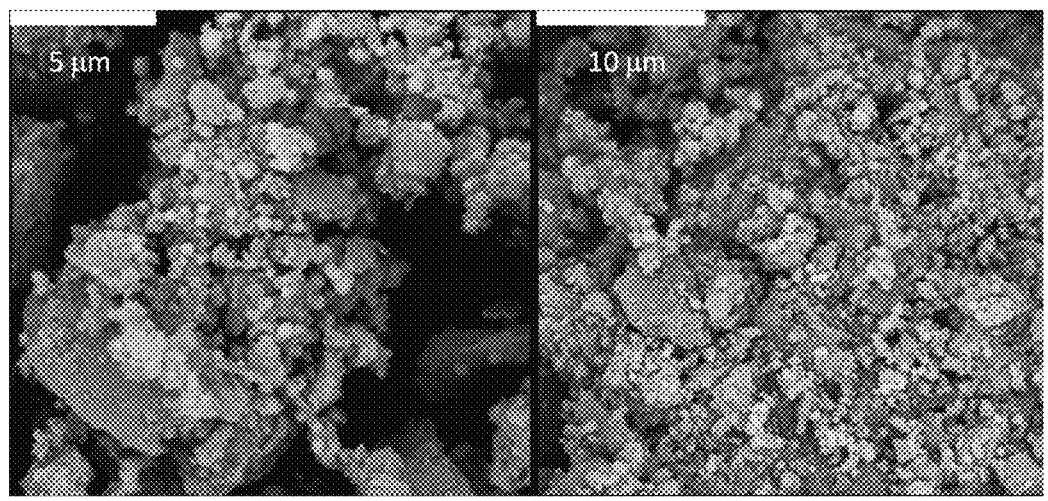
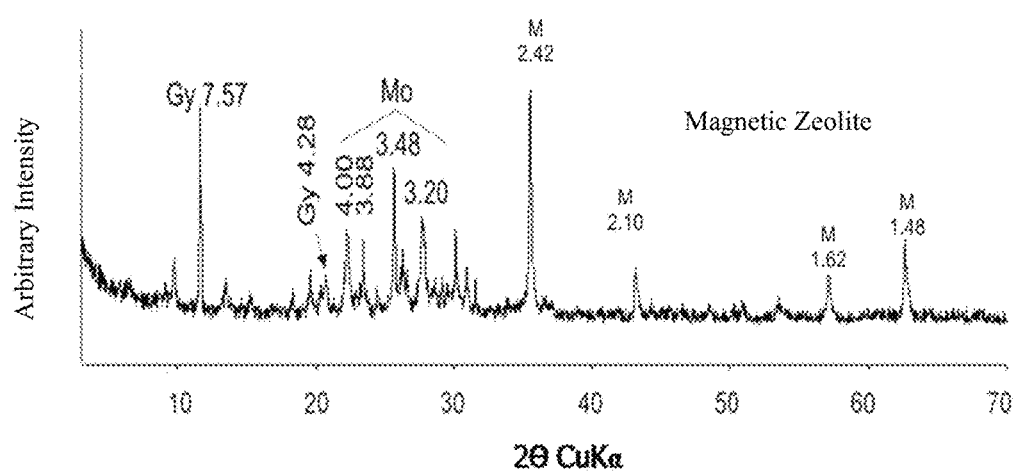
FIG. 4

METHOD OF MAGNETIZING NATURAL AND SYNTHETIC ALUMINOSILICATES

FIELD OF THE INVENTION

The objective of the present application is the procedure for the magnetization of different inorganic surfaces, whether natural or synthetic, such as synthetic and natural aluminosilicates (natural zeolites, synthetic zeolites, alumina, allophane, among others), which confers magnetic properties to those surfaces. Also an objective of the present application is the aforementioned magnetized surfaces and their corresponding uses.

BACKGROUND OF THE INVENTION

Over the last decades numerous investigations in various areas have devoted special attention to a group of crystalline aluminosilicates known as zeolites, which have a negative surface charge that allows the exchange of cations, whose basic structure is formed by a three-dimensional regular arrangement of $AlO_4^-$ and $SiO_4^-$ belonging to the tectosilicates group, which give rise to a system of intercommunicated polyhedral cavities that determine the micro porosity of these materials. This derives into diverse applications of this mineral used commercially as ion exchanger, selective adsorbent, dehydrator, molecular sieve, and catalyst.

Because the zeolites do not contaminate nor cause adverse effects to human or animal health, they are so harmless that they are added to various environmental processes for the elimination, adsorption and immobilization of heavy metals, inorganic as well as organic compounds, in addition to the removal of radioactive elements, purification and treatment of water and treatment of sludge, in the petrochemical and mining industry to treat liquid industrial residues, as well as to control spills and extraction of mining acid spills, as supports for catalysts, in industry and agronomy, animal nutrition and health, agriculture, etc.

Considering the adsorption characteristics presented by these materials, they have been reported as selective containers for various substances.

However, if magnetic properties are incorporated in the zeolites by means of a coating, increasing their magnetic susceptibility, their use for the elimination of contaminants would be expanded, as well as a means for controlled delivery of drugs, genes, proteins, antigens, and other molecules.

All this leads us to propose that the characteristics of the zeolites when coated with magnetic iron particles would enhance their use in many areas.

SUMMARY OF THE INVENTION

Inorganic surfaces are largely varied and this patent will emphasize aluminosilicates, consisting of aluminum and silicon. Different concentrations of aluminum and silicon give rise to a great variation of structures and properties, among them the type of cation coordination. That is why we will exemplify the magnetization process of a surface with a known aluminosilicate like zeolite, which has a negative surface charge that allows cation exchange. Its basic structure is made of a three-dimensional arrangement of silicon tetrahedral with substitution of silicon by aluminum in the structure, generating a negative structural charge whose magnitude depends on the degree of substitution. The zeolites belong to the tectosilicates group. These structures are connected, giving rise to a system of interconnected polyhedral cavities that determine the material's porosity, with the pores being of microscopic or macroscopic size.

Zeolites, of low cost, are widely used to adsorb and absorb different organic and inorganic contaminants. The high specific surface area, associated with a negative structural charge, gives them an excellent ion exchange capacity.

Over the last years zeolite particles have attracted increasing attention due to their applications in electronics and biotechnology. Coating these materials with magnetic materials allows a huge range of applications to be foreseen.

Getting a magnetic zeolite is possible by means of a magnetite ($Fe_3O_4$) coating which is achieved by in situ precipitation of the iron oxide. The zeolite coated with magnetite provides easy recovery and separation by the application of an external magnetic field. However, the use of these particles is conditioned by size control, associated mechanisms, and the chemical characteristics of the species that it is desired to adsorb (adsorbates).

Usually, the surfaces are coated with magnetic materials by the co precipitation of two types of iron (II and III). However, in the procedure reported here the surface is wet-impregnated with excess solvent, in which only one type of iron is used. This process is applicable to different aluminosilicates, always yielding a magnetic surface.

The incorporation of magnetic properties to the surface of aluminosilicates increases significantly their potential uses by bringing together the diversity of applications of aluminosilicate with the ease of recovery achieved by the incorporation of magnetic material.

BRIEF DESCRIPTION OF THE DRAWINGS

FIG. 3: Image of magnetic zeolite obtained by scanning electron microscopy.

FIG. 4: X-ray diffraction parameters of magnetic zeolite. Assignment of the most important signals corresponds to calcium sulfate (Gy), mordenite (Mo), and magnetite (M).

DETAILED DESCRIPTION OF THE INVENTION

Procedure for Obtaining Magnetic Coatings

Figure 1:
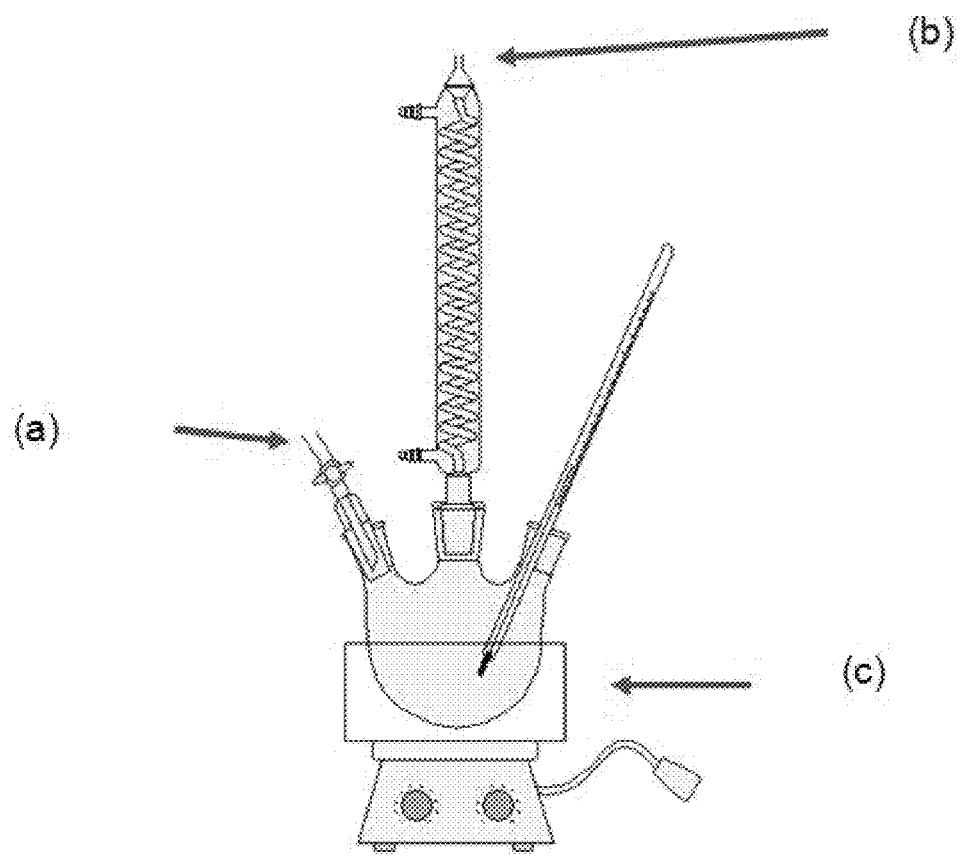
FIG. 1: An experimental scheme for getting magnetic products.

The procedure for the incorporation of Fe magnetic coating on a surface uses an $FeSO_4$ solution with an Fe concentration of 0.1 to 2 M, depending on the surface that it is desired to coat. The process is carried out in an inert atmosphere to avoid decomposition of the product, and at a temperature of 363±5° K. The surface to be coated is then added and a 0.001 M solution of $KNO_3$ prepared in an 8 M solution of $NH_4OH$ solution is added. All these solutions must be made according to the surface area that it is desired to coat. After the addition, the mixture is kept for 60 minutes in the container in which it was prepared, keeping the temperature constant and always in an inert atmosphere. The product is then removed from the container and it is dried at ambient temperature. FIG. 1 is a schematic diagram of the procedure used, where (a) represents the inlet through which the solutions are added; (b) represents the inlet for the inert gas required to keep an inert atmosphere; and (c) denotes the surface used to keep the temperature constant. This procedure requires constant stirring.

Figure 2:
FIG. 2: Response of magnetic zeolite to the presence of a magnet.

After carrying out this procedure, which we will exemplify with zeolite, a first experimental test was ran which consisted in placing the magnetized surface near a magnet, whose response is shown in FIG. 2. Then other characterization tests were ran for the magnetized product, using as reference the demagnetized product. For this purpose different techniques were applied, such as:

Scanning Electron Microscopy (SEM)

The samples obtained were analyzed by scanning electron microscopy. Preparation of the samples for microscopy consisted in drying them in an oven (50° C.), depositing them on carbon reticles, covering them with a thin carbon coat. Observation was made on a Zeiss DSM 960 microscope equipped with an energy dispersive X-ray detector (EDAX). The microscopy was made at a 35° angle, 15 kV acceleration voltages, a distance of 25 mm, and a current of 1-5 nA.

X-Ray Diffraction (XRD)

The samples were identified by powder X-ray diffraction on a Philips X'Pert diffractometer with $K\alpha$ Cu radiation and a graphite monochromator. The XRD patterns were obtained from random films of the powder.

Vibrating Sample Magnetometry

The magnetic properties of the different species were measured in a controlled temperature room on a vibrating sample magnetometer, whose results are given in the hysteresis curves.

Experimental Results

The results of the scanning electron microscopy (SEM) are presented in FIG. 3, showing a homogeneous species of magnetic zeolite, where a coating of sphere-type particles characteristic of magnetite is seen on the zeolite. By XRD characterization (FIG. 4) it is seen that the product corresponds to zeolite with a magnetite coating. The XRD shows that after the coating process a zeolite called mordenite (ICDD-PDF card n° 00-006-0239) is obtained, with its characteristic signals at 0.400, 0.388, 0348 and 0.320 nm. The signals corresponding to magnetite at 0.484, 0.297, 0.253, 0.210, 0.162 and 0.148 nm are also seen.

Figure 5:
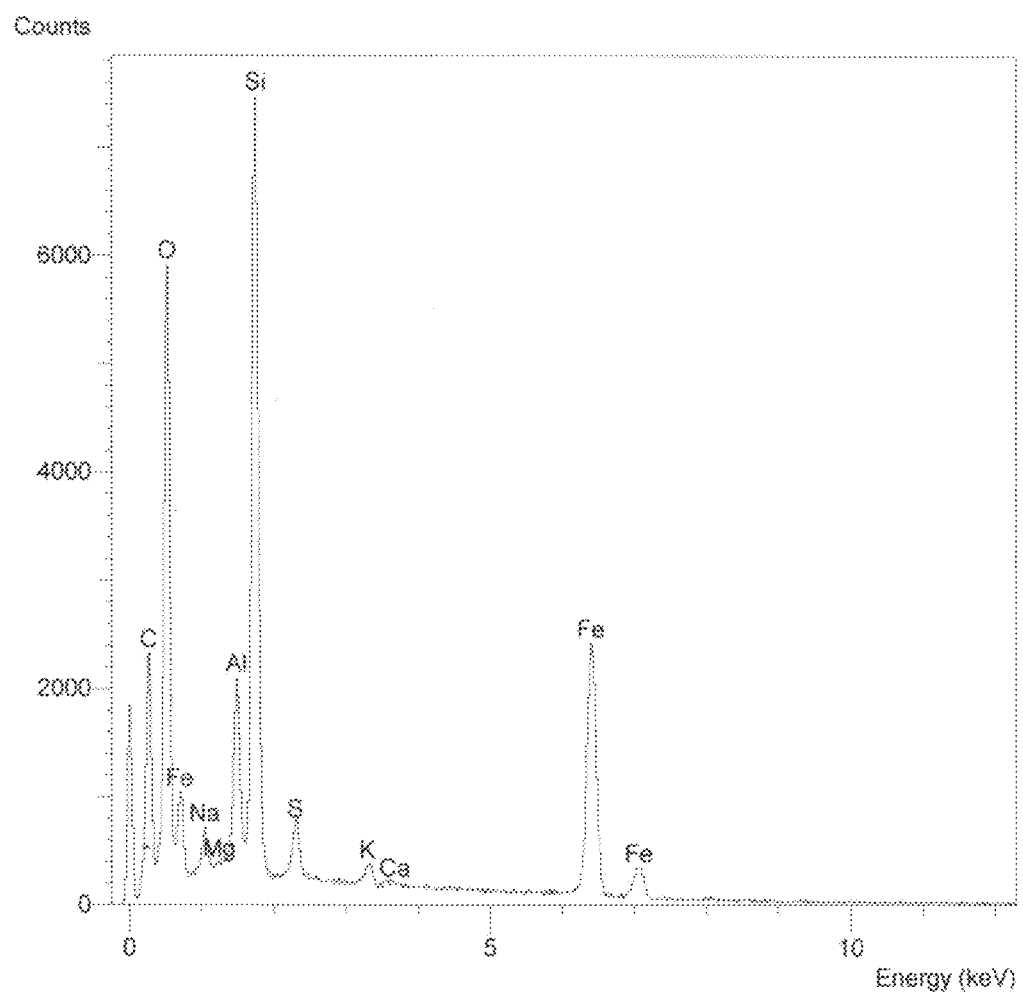
FIG. 5: Elemental analysis of magnetic zeolite.

Electron scanning microscopy and X-ray diffraction deliver complementary results. During the magnetization process there is a displacement of calcium ions from natural zeolite which, together with the $SO_4^-$ incorporated with the Fe salt, precipitate forming $CaSO_4$, whose presence is confirmed by the analysis made with the analytical probe (EDAX) during the scanning electron microscopy (FIG. 5). From the SEM and XRD results it is seen that the Fe deposit on natural zeolite is homogeneous and is constituted only by magnetite.

Figure 6:
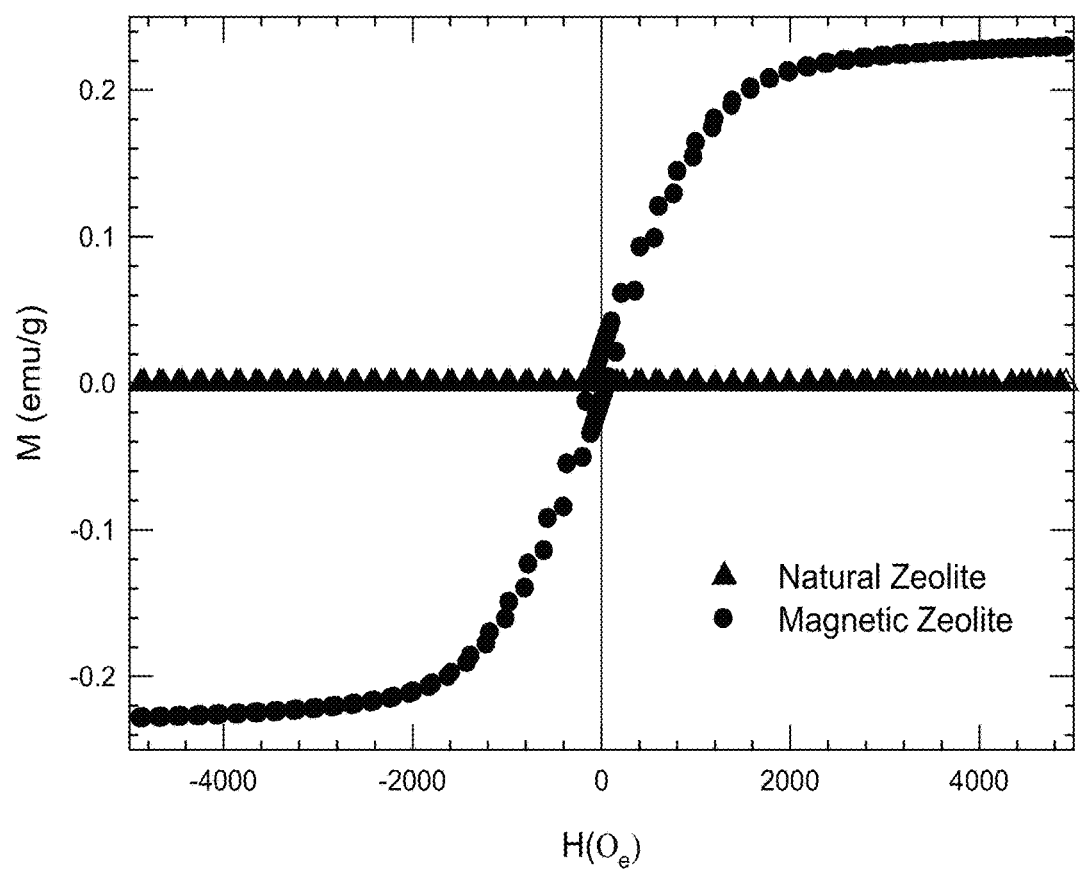
FIG. 6: Hysteresis curve of synthetic iron oxide and magnetic zeolite.

Magnetization tests were made on natural zeolite and magnetic zeolite by means of so-called hysteresis curves. The magnetization curve of natural zeolite indicates that it has no magnetic components before the synthesis. However the magnetic zeolite (FIG. 6) presents a magnetization of 80 emu/g. The value found for magnetic zeolite indicates that the sample is constituted by a mixture of the two species (zeolite and magnetite), of which only one is magnetic and it is found in a smaller proportion. A consequence is that the magnetic saturation of the magnetic zeolite is 13 emu/g.

The preparation of aluminosilicates with magnetic surface coatings was made with different ranges of (surface to be covered):(amount of iron deposited) ratios.

For the magnetic zeolite (used to exemplify the process) the magnetic saturation is affected by the proportion of iron oxides used in the synthesis. It is possible to get higher magnetization saturation values by increasing the proportion of iron during the synthesis stage. An excessive increase of the magnitude of the coating would have as a consequence a reduction of the pores available to allow access to the active sites located in the internal surface of the zeolite, reducing its adsorption capacity and altering its absorption potential.

The magnetic measurements of both the iron oxides and the magnetic zeolite have been made over time for weeks, with the magnetic saturation remaining constant, indicating good magnetic stability of the material prepared with the proposed methodology under normal storage conditions (25° C.).

From the tests made it is possible to establish that the magnetization process can be carried out on different types of inorganic surfaces with different degrees of magnetization, depending on the use that will be given to the surfaces.

The use of magnetized aluminosilicates can be quite varied because they do not contaminate, they do not have any adverse effects on the environment, and since they are harmless to human and animal health, to name just a few, they can be used for the elimination of organic as well as inorganic contaminants and radioactive elements in solution through sorption and immobilization, and they can also be used for the controlled release of medicines, as well as in catalysts and catalyst supports; in industrial processes, in agronomic applications, in animal nutrition and health, etc.

Figure 7:
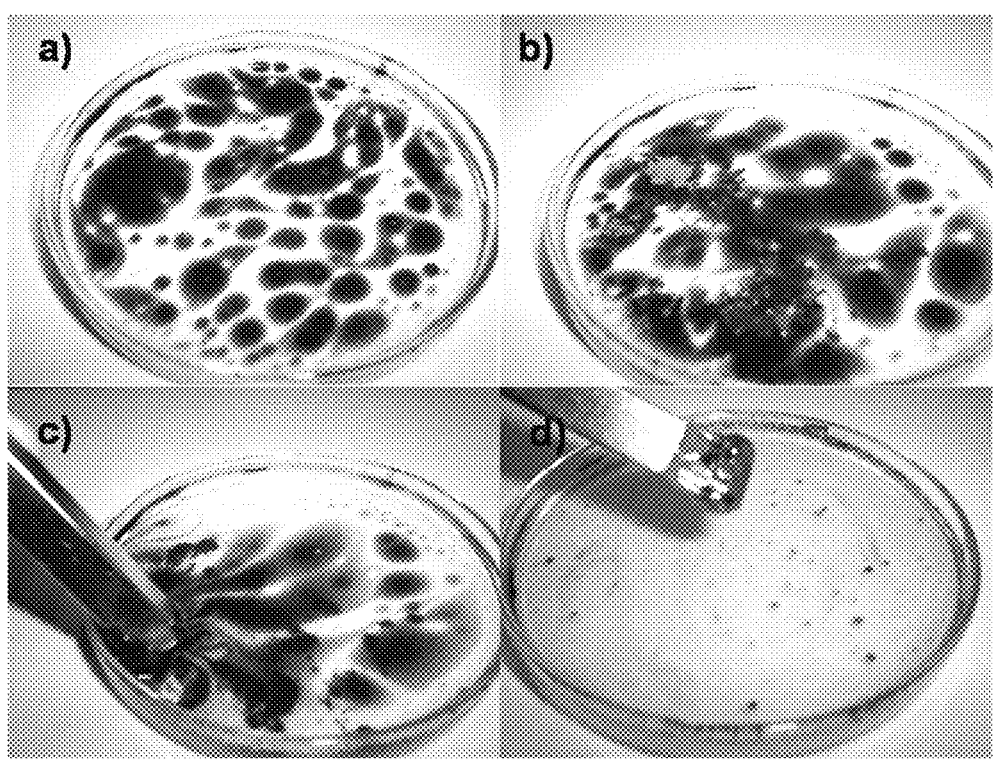
FIG. 7: (a) Petroleum on water. (b) Magnetic zeolite on the petroleum spot. (c) Application of the magnetic field. (d) Clean surface.

As a specific example, magnetic zeolite can be used to remove oil spills on water (FIG. 7(a), (b)); this application has been shown in tests made at the laboratory level, where the recovery of the spilled product is seen with magnetic zeolite (FIG. 7(c)), to obtain as final product water free of that pollutant (FIG. 7(d)). For that purpose a test was made in which 10 mL of water were placed in a container and 1 mL of petroleum was placed on the water, where it was dispersed on the surface in the form of droplets, as shown in FIG. 7(a). A 250 mg sample of coated (magnetized) zeolite was placed over the liquid surface (FIG. 7(b)). Then a magnet passed over the surface extracted both the magnetized zeolite and the oil absorbed by it (FIG. 7(c)), recovering 244 mg of the zeolite used in the procedure. In this way a surface free of oil is obtained as shown in FIG. 7(d).

What is claimed is:

1. A procedure for the magnetization of inorganic surfaces by coating those inorganic surfaces with magnetite by in situ precipitation of iron oxide, comprising the steps of:
heating a solution of $FeSO_4$, with an Fe concentration of 0.1 to 2 M, at 363±5° K, under an inert atmosphere in a container,
placing the inorganic surfaces in the heated solution in the container;
adding a 0.001 M solution of $KNO_3$ prepared in 8 M $NH_4OH$ to the heated solution and inorganic surface in the container to form a mixture in the container;

keeping the mixture at a constant temperature and an inert atmosphere for about 60 minutes to produce a product comprising the inorganic surfaces coated with magnetite;
removing the product from the container; and
drying the product at ambient temperature.

2. A procedure according to claim 1 wherein the inorganic surfaces are selected from the group consisting of natural inorganic surfaces or synthetic inorganic surfaces;
  wherein the natural inorganic surfaces are selected from the group consisting of natural zeolites, alumina, allophane, and combinations thereof; and
  wherein the synthetic inorganic surfaces are selected from the group consisting of synthetic aluminosilicates, synthetic zeolites, and combinations thereof.

* * * * *